United States Patent [19]

Silvestri et al.

[11] 3,971,228
[45] July 27, 1976

[54] PROCESS AND SYSTEM FOR LIFTING SUBMARINE PIPELINES

[75] Inventors: Antonio Silvestri; Pasquale Brando, both of San Donato Milanese, Italy

[73] Assignee: Saipem S.p.A., San Donato Milanese, Italy

[22] Filed: Feb. 22, 1974

[21] Appl. No.: 444,772

[30] Foreign Application Priority Data

Feb. 23, 1973  Italy .................................. 20745/73

[52] U.S. Cl. ................................ 61/114; 294/66 R
[51] Int. Cl.² ........................................... F16L 1/00
[58] Field of Search ............... 61/72.3, 72.1; 294/66

[56] References Cited
UNITED STATES PATENTS

| | | | |
|---|---|---|---|
| 3,690,111 | 9/1972 | Matthews, Jr. ........................ | 61/72.3 |
| 3,751,932 | 8/1973 | Matthews, Jr. ........................ | 61/72.3 |

*Primary Examiner*—Jacob Shapiro
*Attorney, Agent, or Firm*—Ralph M. Watson

[57] ABSTRACT

A closed end of a pipeline submerged in water to a depth of upwards of about 125 meters if lifted to the surface and recovered by exerting a pull on said end by means of a capstan mounted on a floating pontoon and having an adjustable tension, and by simultaneously exerting a lift on said pipeline at said end and at least one point spaced from said end by means of a set of cranes mounted on said pontoon, at least one of said cranes being mounted for movement on said pontoon and adapted to exert a lift at said end of the pipeline, and at least one other crane being fixed to said pontoon and adapted to exert a lift at said end and at the point spaced from said end of the pipeline, so that the length of the pipeline between said point and said end may be removed from the balance of the pipeline.

1 Claim, 6 Drawing Figures

PROCESS AND SYSTEM FOR LIFTING SUBMARINE PIPELINES

This invention relates to a process and a system for lifting submerged pipelines. The processes and systems known up to now employ, for such lifting, pontoons supporting cranes which, by means of their cables, effect a direct and simple lifting. In other words the cables of the cranes are applied on the body of the pipeline at points of support more or less interspaced and successively they exert an action of vertical lifting more or less contemporaneously.

Said processes and systems have the remarkable disadvantage that they can be used only when the depths do not exceed 30–40 meters. These processes may not be used for greater depths.

This fact is particularly remarkable when the pipeline 7 for any reason whatever, is full of water.

To overcome that drawback and in order to operate at a depth of about 130–150 meters and more, this invention includes the use of a tensioning capstan having an adjustable tension, the cable of which is applied to the head of the pipeline 7 provided with a suitable closure.

The passage from the application of a simple lifting the processes and systems of the present techniques to a diagonal pull by means of a capstan allows an operation without risk and easily realized.

The tensioning capstan having an adjustable tension advantageously co-operates with one or more fixed cranes and with one or more moving cranes.

The task of the fixed cranes is to support a great part of the weight of the pipeline 7 and the task of the moving cranes is to recover defective suctions of the submarine pipeline and the insertion of new parts.

In the application of the process and system of the present invention it is important to combine the tractive forces of the tensioning capstan or capstans with the motion of the pontoom.

In the choice of the powers of the lifting and tensioning elements one should to take into account the following two possibilities:

a. recovery of an empty pipeline
b. recovery of a full pipeline.

The cables of the tensioning capstan or capstans and of the fixed crane or cranes are applied to the head of pipeline by people skilled in sub-marine work (frogmen).

The invention will be described with reference to an actual case of the lifting of a full submerged pipeline about 125 meters in order to recover a defective length of the same and to replace it with a new one.

It will be appreciated that the particular data are cited only by way of an unrestrictive and not limitative example.

The accompanying drawings illustrate this concrete case and point out the operative easiness of it.

BRIEF DESCRIPTION OF THE DRAWING

FIG. 1 shows the beginning of the recovery of the pipe 7 from a marine depth. The hooking of the cable 1 to the head 2 of the pipeline, closed by an appropriate type of cap 7 allows the application of a pull by means of an orientable back gear of the tensioning capstan 3 inside the ship. Said capstan is provided with an adjustable tension.

FIG. 2 shows the arrival of the head 2 in proximity to the sea surface. At this time, the connection of cables 4 and 5 of the principal crane 8 and the connection of the cable 6 of the moving crane are operative.

In FIG. 3 the capstan is made inactive by releasing cable 1 of the tensioning capstan and the load passes therefore to the cables 4 and 5 of the principal crane 8, in particular to cable 5, in order that the loads of the cables 4 and 6 be small in comparison with the load of cable 5.

In this phase there is effectuated a cutting operation at point B.

Figure 1:
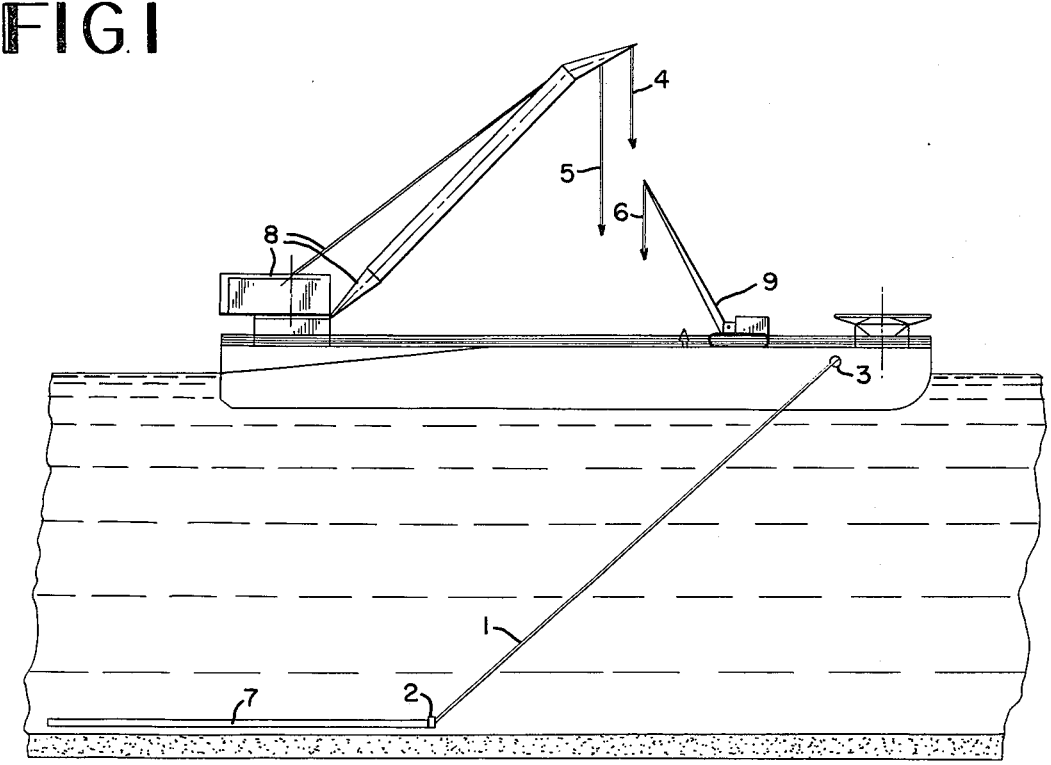
FIG. 1, illustrates diagrammatically the commencement of a pipeline recovery operation.
Figure 2:
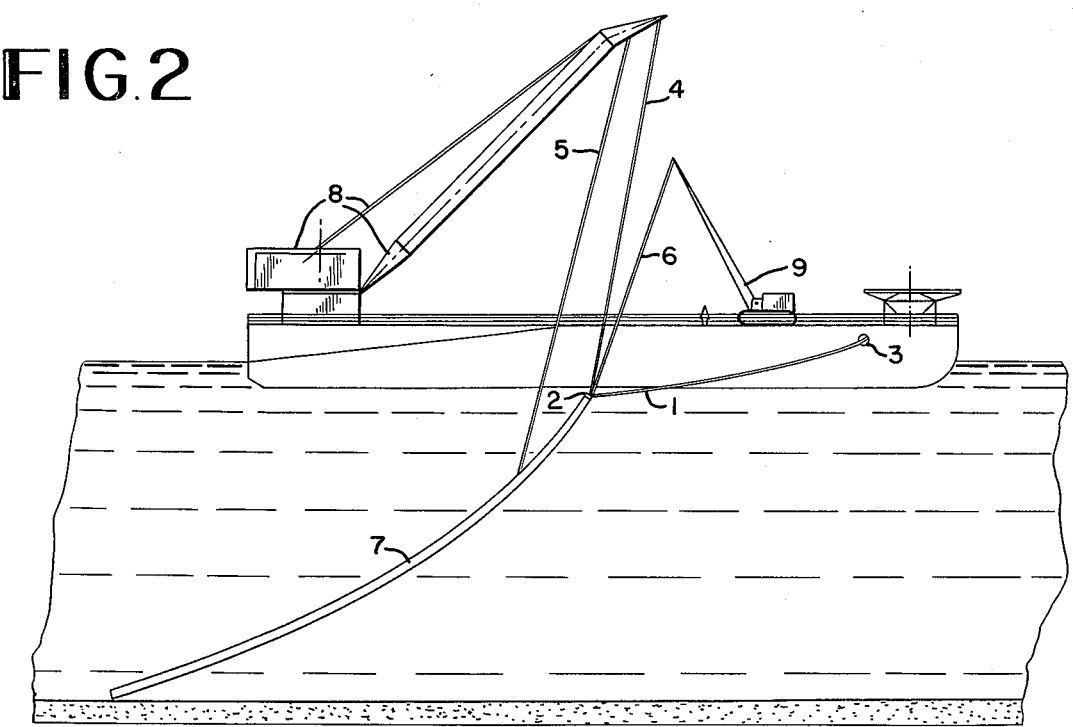
FIG. 2 illustrates diagrammatically the lifting of a pipeline to the water surface.
Figure 3:
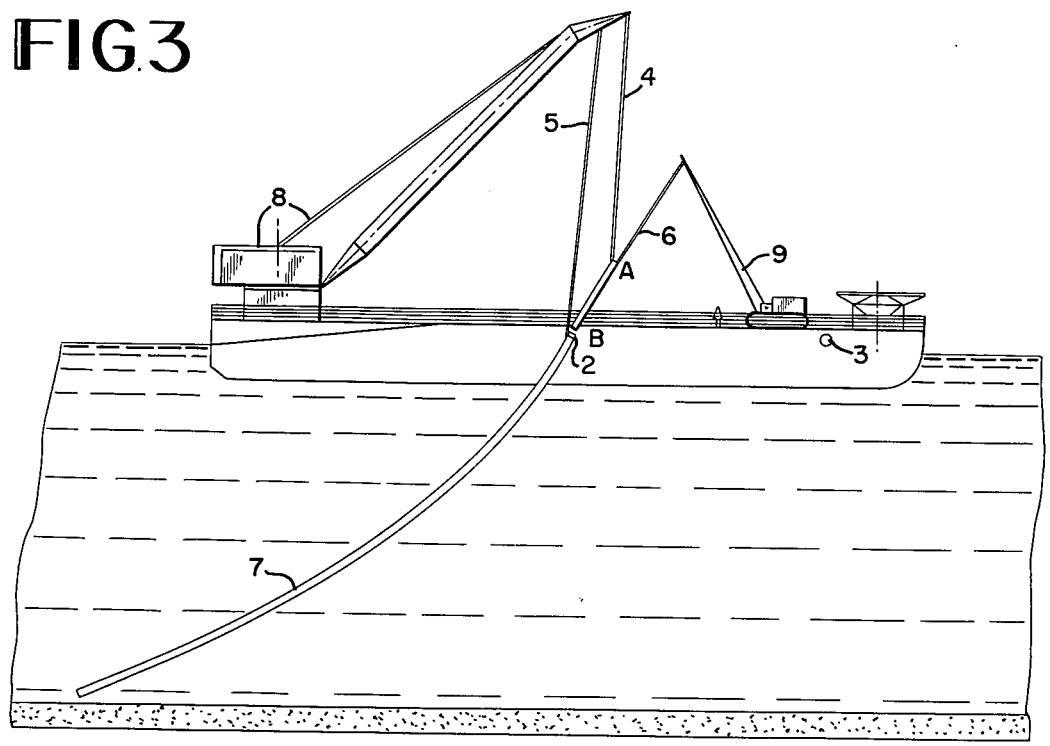
FIG. 3 illustrates diagrammatically the severing of a section of a pipeline from the balance thereof.
Figure 4:
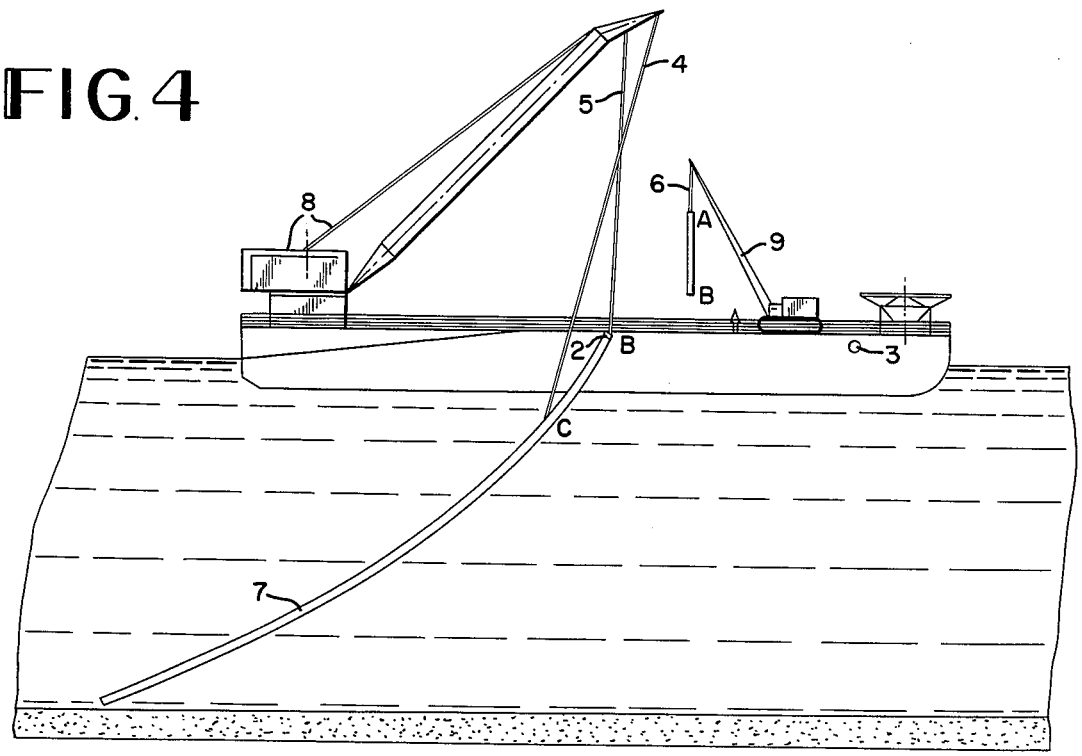
FIG. 4 illustrates diagrammatically the removal of the severed section.

FIG. 4 shows the situation after having removed by means of the moving crane 9 the damaged length of pipe A-B that has been cut away from the main pipe 7. Optionally, there may be provided auxiliary cables which prevent oscillations of the length of the pipe A-B free at the extremity of cable 6. In the same FIG. 4 is shown the transfer of cable 4 beyond the cable 5, and the load now is transferred to cable 4. Now the apparatus is operated, in an analogous way to what is shown in FIG. 3, for the recovery of the length B-C. It will be appreciated that the operation may be repeated more times by causing the pontoon 10 to draw back a suitable distance.

Figure 5:
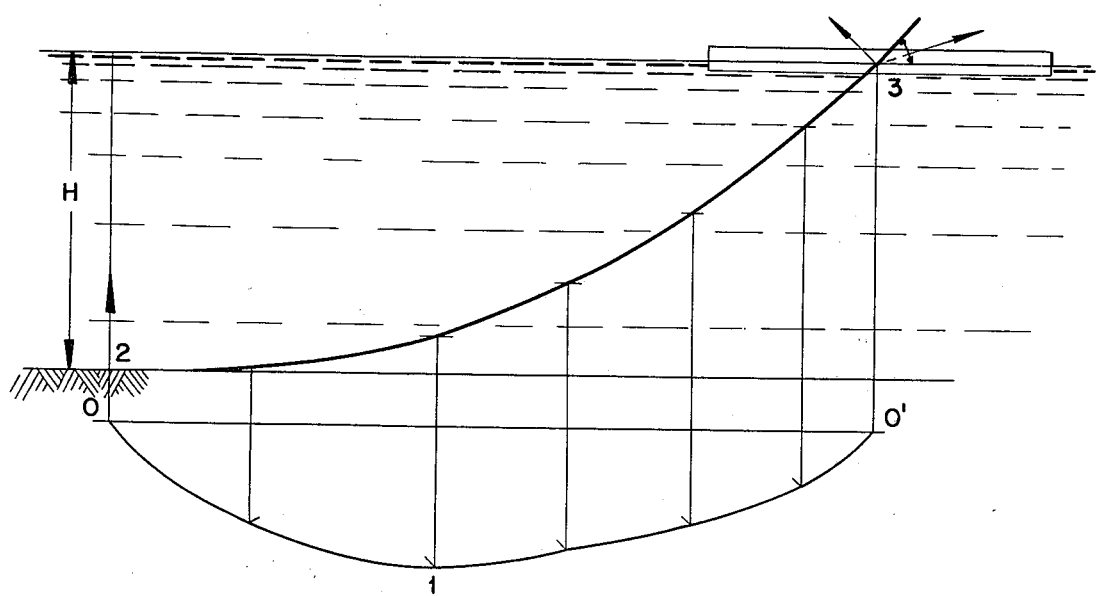
FIG. 5 is a diagram of the bending stresses on an empty pipeline as it is lifted to the surface.
Figure 6:
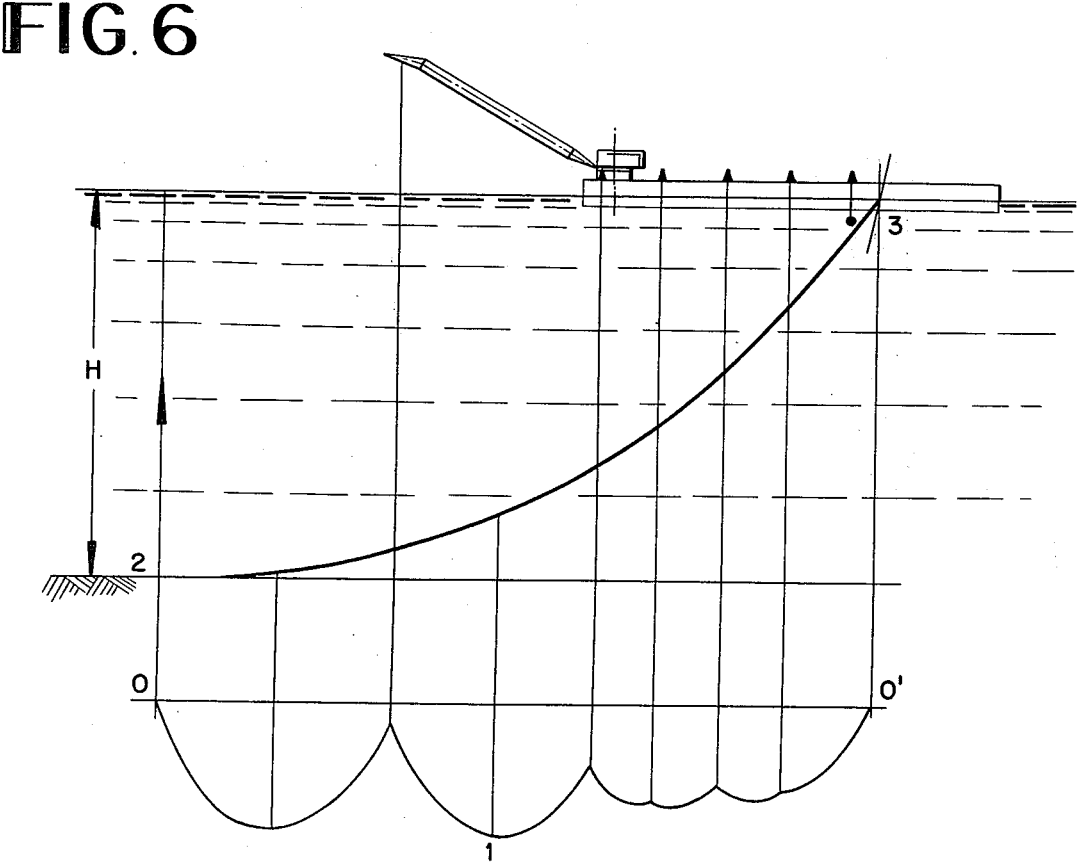
FIG. 6 is a diagram of the bending stresses on a full pipeline as it is lifted to the water surface.

FIGS. 5 and 6 show respectively the elastic deformation curves and diagrams of the moments relative to the lifting of an empty and of a full pipe for heights of about 125 meters.

In the first case, the use of a tensioning capstan alone is sufficient, in the second case, in combination with the tensioning capstan, the principal crane and associated groups of lifting elements arranged on the side of the pontoon cooperate. The low parts of FIGS. 5 and 6 show the diagrams of the partial bending stresses.

I claim:

1. A method of lifting a closed end of a pipeline submerged in water from a deep depth to the surface of the water and recovering a length of said pipeline terminating in said end, which consists in first exerting a diagonal pull on said end by means of a capstan mounted on a floating pontoon and having an adjustable tension, and then simultaneously exerting a lift on said pipeline at said end and at least one point spaced from said end by means of a set of cranes mounted on said pontoon, at least one of said cranes being mounted for movement on said pontoon and adapted to exert a lift at said end of the pipeline, and at least one other crane being fixed to said pontoon and adapted to exert a lift at said end and at the point spaced from said end of the pipeline so that the length of the pipeline between said end and said point is raised above the surface of the water to a point at which said length may be removed from the balance of the pipeline.

* * * * *

UNITED STATES PATENT AND TRADEMARK OFFICE
CERTIFICATE OF CORRECTION

PATENT NO. : 3,971,228
DATED : July 27, 1976
INVENTOR(S) : Antonio Silvestri and Pasquale Brando It is certified that error appears in the above-identified patent and that said Letters Patent are hereby corrected as shown below:

First page, line 2 of Abstract, after "meters" change "if" to read -- is --.

Col. 1, line 27, after "lifting" insert -- through --, line 36, correct "suctions" to read -- sections --.

Col. 2, line 10, after "cap" insert a comma -- , -- and delete "7".

Signed and Sealed this

Twenty-eighth Day of August 1979

[SEAL]

Attest:

Attesting Officer

LUTRELLE F. PARKER
Acting Commissioner of Patents and Trademarks